No. 720,080. PATENTED FEB. 10, 1903.
W. H. SPAKE.
FLY ESCAPE ATTACHMENT FOR WINDOW SCREENS.
APPLICATION FILED JULY 21, 1902.
NO MODEL.
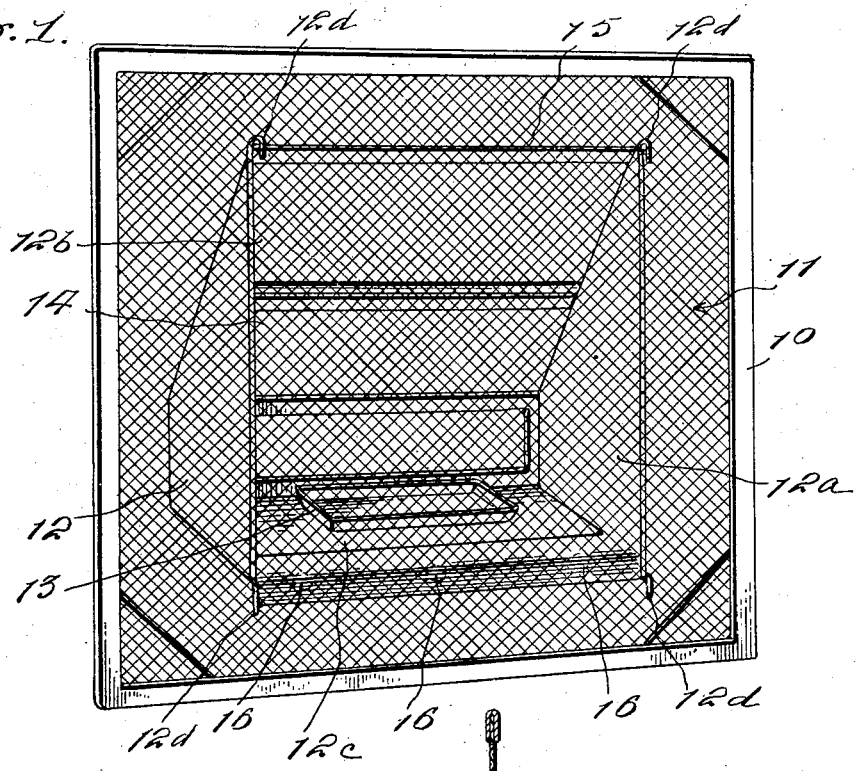
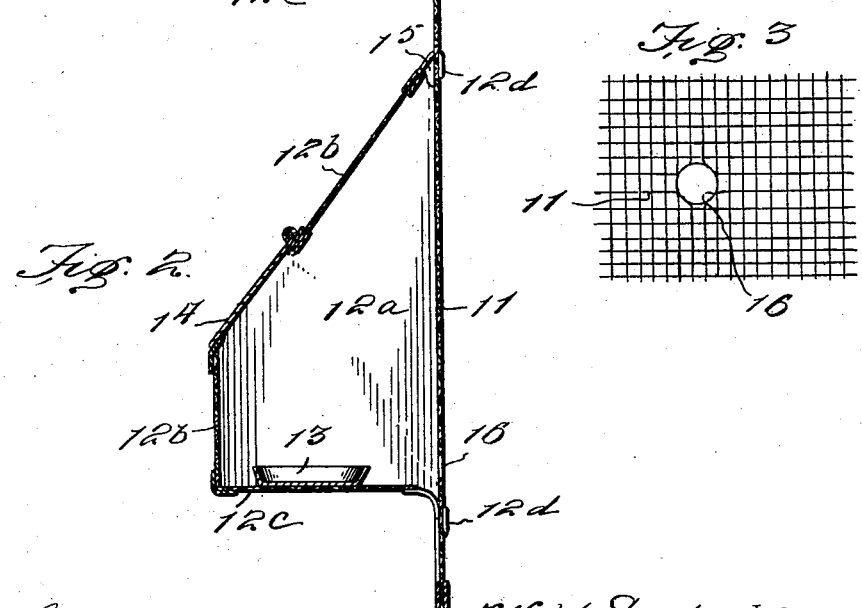
Witnesses
W. H. Spake Inventor
by C. A. Snow & Co.
Attorneys
THE NORRIS PETERS CO., PHOTO-LITHO., WASHINGTON, D. C.

UNITED STATES PATENT OFFICE.

WILLIAM H. SPAKE, OF ANAHEIM, CALIFORNIA.

FLY-ESCAPE ATTACHMENT FOR WINDOW-SCREENS.

SPECIFICATION forming part of Letters Patent No. 720,080, dated February 10, 1903.

Application filed July 21, 1902. Serial No. 116,471. (No model.)

*To all whom it may concern:*

Be it known that I, WILLIAM H. SPAKE, a citizen of the United States, residing at Anaheim, in the county of Orange and State of California, have invented a new and useful Fly-Escape Attachment to Fly-Screens, of which the following is a specification.

This invention relates to attachments to fly-screens for windows, whereby flies are induced to leave the room, but to which they will be prevented from returning; and the invention consists in certain novel features of construction, as hereinafter shown and described, and specified in the claims.

In the drawings illustrative of the invention, Figure 1 is a perspective view of a window-screen with the improvement attached. Fig. 2 is a vertical sectional view of the same. Fig. 3 is an enlarged detail of a portion of a screen material, illustrating the manner of forming the fly-escape apertures therethrough.

The device may be attached to any wire-cloth window-screen, such as shown in the drawings, wherein 10 represents the frame, and 11 the wire-cloth covering. On the outside of the screen is secured a frame, preferably with imperforated ends 12 12$^a$ and with a wire-cloth front or outer side 12$^b$ and the bottom 12$^c$. The frame is supplied at the inner corners with wire hooks 12$^d$, adapted to be inserted through the mesh of the wire-cloth-screen material, as shown, by which means the trap-frame may be supported detachably from the screen and without injury thereto. Supported upon the bottom 12$^c$ is a pan 13, adapted to hold "fly-bait" of some description, such as molasses, and the front 12$^b$ will be provided with a movable door or closure 14, through which the pan may be replenished. The front 12$^b$ is inclined inwardly and upwardly toward the screen, but is not engaged thereto at the top, leaving a contracted slit 15, through which the flies will escape. Small apertures 16 will be formed through the screen material 11 and leading into the interior of the trap-frame near the bottom 12$^c$, as shown, through which the flies will pass to the trap. These apertures 16 are formed by inserting a small round implement, such as a bodkin, into one of the square openings in the wire-cloth material and crowding the four adjacent wires outwardly, as indicated in Fig. 3, and without breaking the wires. This will make an aperture nearly as large in area as four of the usual openings in the mesh of the screen material and without injury to the material, but of ample size to permit the passage of a fly or smaller insect. Then if for any reason it is desired to dispense with the "trap" attachment the bent wires can be readily restored and the apertures closed and no injury will result to the screen material. As many of the apertures may be formed as may be required. The flies attracted by the molasses or other bait in the pan 13 will pass through the apertures 16 and by reason of the apertures being at the lower part of the trap portion they will not pass back again into the room, but will crawl up the screen-surface, and so escape to the outside air through the slit 15.

This makes a very simple, cheap, and complete fly-escape which may be attached to any screen and readily removed therefrom when not required and the cloth material restored to its normal condition, as before stated.

Having thus fully described my invention, what I claim is—

1. In a device of the class described, the combination with a screen having apertures for the passage of flies formed by bending the wires surrounding one or more of the interstices in the screen material away from the interstice to provide an enlarged intersticial opening without breaking the wires, whereby the latter may be returned to their initial position, of an inclosure open at one side to fit against the screen and tapered toward the top and composed of end walls, a horizontal bottom, an upright outer wall, and an inclined top wall having its upper edge spaced from the screen to form an opening for the escaping of flies, said inclosure being also provided with a door, and means for attaching the inclosure to the screen, substantially as described.

2. An attachment for fly-screens comprising an inclosure open at one side to fit against a screen and tapered toward the top and composed of imperforate end walls, a horizontal bottom, an upright outer wall, and an inclined top provided with a door to permit access to its interior and having its upper edge spaced from the screen to form an opening for the escape of flies, and means for attaching the inclosure to a screen, substantially as described.

In testimony that I claim the foregoing as my own I have hereto affixed my signature in the presence of two witnesses.

WILLIAM H. SPAKE.

Witnesses:
BIRD V. BEEBE,
JAMES S. HOWARD.